(12) United States Patent
Bucklew et al.

(10) Patent No.: US 11,418,330 B2
(45) Date of Patent: Aug. 16, 2022

(54) QUANTUM COMMUNICATION SYSTEM THAT SWITCHES BETWEEN QUANTUM KEY DISTRIBUTION (QKD) PROTOCOLS AND ASSOCIATED METHODS

(71) Applicant: EAGLE TECHNOLOGY, LLC, Melbourne, FL (US)

(72) Inventors: Victor G. Bucklew, Colorado Springs, CO (US); James A. Nagel, Fort Wayne, IN (US); Michael R. Lange, Melbourne, FL (US)

(73) Assignee: EAGLE TECHNOLOGY, LLC, Melbourne, FL (US)

(*) Notice: Subject to any disclaimer, the term of this patent is extended or adjusted under 35 U.S.C. 154(b) by 271 days.

(21) Appl. No.: 16/658,398

(22) Filed: Oct. 21, 2019

(65) Prior Publication Data

US 2021/0119786 A1 Apr. 22, 2021

(51) Int. Cl.
*H04L 9/08* (2006.01)
*H04B 10/70* (2013.01)
*H04L 9/12* (2006.01)

(52) U.S. Cl.
CPC .......... *H04L 9/0852* (2013.01); *H04B 10/70* (2013.01); *H04L 9/12* (2013.01)

(58) Field of Classification Search
CPC .......... H04L 9/0852; H04L 9/12; H04B 10/70
See application file for complete search history.

(56) References Cited

U.S. PATENT DOCUMENTS

| 7,831,049 | B1 | 11/2010 | Kanter |
| 9,306,739 | B1* | 4/2016 | Troupe .................. H04L 9/0858 |
| 9,634,770 | B2 | 4/2017 | Dynes et al. |
| 11,050,559 | B2 | 6/2021 | Bucklew et al. |
| 11,082,216 | B2 | 8/2021 | Bucklew et al. |
| 2003/0002674 | A1 | 1/2003 | Nambu et al. |
| 2005/0281561 | A1 | 12/2005 | Tomaru |
| 2007/0036353 | A1 | 2/2007 | Reznik et al. |
| 2007/0064945 | A1 | 3/2007 | Yuan et al. |

(Continued)

FOREIGN PATENT DOCUMENTS

| EP | 3185463 | 6/2017 |
| KR | 20180104296 | 9/2018 |

(Continued)

OTHER PUBLICATIONS

Gariano et al. "Trade Study of Aperture Size, Adaptive Optics and Multiple Spatial Modes For a Polarization Entanglement QKD System Over A 30 Km Maritime Channel." Applied Optics. vol. 57, No. 28. (2018) pp. 8451-8459.

(Continued)

*Primary Examiner* — Baotran N To
(74) *Attorney, Agent, or Firm* — Allen, Dyer, Doppelt + Gilchrist, P.A.

(57) ABSTRACT

A quantum communications system includes a communications system that operates with a quantum key distribution (QKD) system, which includes a transmitter node, a receiver node, and a quantum communications channel coupling the transmitter node and receiver node. The transmitter node may be configured to transmit to the receiver node a bit stream of optical pulses, and switch between first and second QKD protocols based upon at least one channel condition.

15 Claims, 4 Drawing Sheets

(56) References Cited

U.S. PATENT DOCUMENTS

| | | | |
|---|---|---|---|
| 2008/0101612 A1* | 5/2008 | Imai | H04L 9/0852 380/278 |
| 2010/0310259 A1 | 12/2010 | Meyers et al. | |
| 2011/0200192 A1 | 8/2011 | Etemad et al. | |
| 2012/0177201 A1* | 7/2012 | Ayling | H04L 9/0858 380/278 |
| 2013/0016835 A1* | 1/2013 | Zbinden | H04L 9/0852 380/255 |
| 2016/0233964 A1 | 8/2016 | Frohlich et al. | |
| 2016/0234017 A1 | 8/2016 | Englund et al. | |
| 2016/0234018 A1 | 8/2016 | Frohlich et al. | |
| 2017/0019252 A1 | 1/2017 | Bitauld et al. | |
| 2018/0191496 A1 | 7/2018 | Duplinskiy et al. | |
| 2018/0198608 A1 | 7/2018 | Nordholt et al. | |
| 2018/0343116 A1 | 11/2018 | Nordholt et al. | |
| 2019/0323892 A1 | 10/2019 | Ye et al. | |
| 2020/0153619 A1 | 5/2020 | Ribordy | |
| 2020/0183250 A1 | 6/2020 | Hall et al. | |
| 2020/0274701 A1 | 8/2020 | Yuan et al. | |
| 2021/0099236 A1 | 4/2021 | Bucklew et al. | |

FOREIGN PATENT DOCUMENTS

| | | |
|---|---|---|
| WO | 2012044149 | 4/2012 |
| WO | 2012074369 | 6/2012 |

OTHER PUBLICATIONS

Lopez et al. "Free-Space-Optical Quantum Key Distribution Systems: Challenges." Chapter 3. Editor: Oleg G. Morozov. Quantum Cryptography in Advanced Networks. 10.5772/intechopen.81032. (2018) pp. 1-14.

Chau et al. "Experimentally Feasible Quantum-Key-Distribution Scheme Using Qubit-Like Qudits and Its Comparison With Existing Qubit—and Qudit-Based Protocols." Physical Review A. vol. 95, Issue 2, 022311 (2017) pp. 1-7.

Vallone et al. "Adaptive Real Time Selection For Quantum Key Distribution in Lossy and Turbulent Free-Space Channels." Physical Review A. vol. 91, Issue 4. 042320. (2015) pp. 1-7.

Bucklew et al., U.S. Appl. No. 16/687,767, filed Nov. 19, 2019.
Bucklew et al., U.S. Appl. No. 16/583,346, filed Sep. 26, 2019.
Bucklew et al., U.S. Appl. No. 16/668,002, filed Oct. 30, 2019.
Bucklew et al., U.S. Appl. No. 16/668,025, filed Oct. 30, 2019.
Bucklew et al., U.S. Appl. No. 17/179,490, filed Feb. 2, 2021.

Barros et al.: "Free-Space Entangled Quantum Carpets," Arxiv.Org. Cornell University Library, 201 Olin Library Cornell University, Ithaca, NY, 14853, DOI: 10.1103/Physreva.95.042311, Feb. 23, 2017, pp. 1-10.

"Quantum Key Distribution; Components and Internal Interfaces," ETSI Draft, QKD05_11_Components_Interfaces, European Telecommunications Standards Institute (ETSI), 650, Route Des Lucioles, F-06921 Sophia-Antipolis, France, Oct. 14, 2009, pp. 1-24.

Farias et al.: "Quantum Information Processing by Weaving Quantum Talbot Carpets," Arxiv.Org. Cornell University Library, 201 Olin Library Cornell University, Ithaca, NY, 14853, DOI: 10.1103/Physreva.91.062328, Dec. 8, 2014 , pp. 1-11.

Donohue et al., "Coherent ultrafast measurement of time-bin encoded photons", Physical Review Letters, PRL 111, 153602, Oct. 2013, pp. 153602-1-153602-5.

Lavoie et al., "Spectral compression of single photons", Institute for Quantum Computing and Department of Physics & Astronomy, Aug. 2013, pp. 1-12.

Nunn et al. , "Large-alphabet time-frequency entangled quantum key distribution by means of time-to-frequency conversion", Optics Express, vol. 21, No. 13, Jun. 2013, pp. 15959-15973.

* cited by examiner

QUANTUM COMMUNICATION SYSTEM THAT SWITCHES BETWEEN QUANTUM KEY DISTRIBUTION (QKD) PROTOCOLS AND ASSOCIATED METHODS

FIELD OF THE INVENTION

The present invention relates to communication systems, and, more particularly, to quantum communication systems using quantum key distribution (QKD) and related methods.

BACKGROUND OF THE INVENTION

In a quantum communication system, information is exchanged between a transmitter node and a receiver node using encoded single photons. Each photon carries information that is encoded on a property of the photons, such as polarization, phase, or energy in time. Quantum key distribution (QKD) allows the sharing of cryptographic keys between the transmitter node, usually referred to as "Alice," and the receiver node, usually referred to as "Bob," allowing a more secure communication between the two parties. The QKD system provides a test whether any part of the key would be known to an unauthorized third party eavesdropper, usually referred to as "Eve." Individual bits of the bit stream are transmitted using single photons. By using complementary properties to which Heisenberg's uncertainty principle applies, information may be encoded into a photon to prevent the unauthorized third party, e.g., "Eve," from monitoring the photon since it would disturb its state. When a secret key is established between the two parties by this QKD system, the two parties may then encrypt data transmitted over any conventional communications channel.

In the QKD system, the two parties as Alice and Bob at the respective transmitter node and receiver node may use two or more non-orthogonal bases to encode bit values. The laws of quantum mechanics apply to the photons and any measurement of the photons by an eavesdropper, e.g., Eve, without prior knowledge of the encoding basis of each photon, causes an unavoidable change to the state of some of the photons. These changes to the states of the photons may cause errors in the bit values sent between the transmitter node and receiver node, and by comparing a part of the common bit steam, the two parties may determine if the eavesdropper, e.g., Eve, has gained information.

Photon polarization is often used to provide the complementary properties for encoding, and is used in the common QKD protocol, BB84, and may be applied to conjugate states, such as phase encoding. Other QKD protocols, such as E91, may be based on entanglement of photon pairs and used in a QKD system. The optical path between the transmitter node, e.g., Alice, and the receiver node, e.g., Bob, are connected by a quantum communications channel, which may be free-space or an optical fiber, for example. The transmitter node and receiver node are also each connected to each other via a conventional communications channel, which is used for key exchange or as commonly referred, key sifting.

Each bit of information, such as a "0" or "1", may be encoded onto an individual photon by selecting from a pair of orthogonal polarization states. In the BB84 protocol, for example, two pairs of states are used, and each pair of orthogonal states is referred to as a "basis." The Heisenberg uncertainty principle of quantum indeterminacy indicates that the different states cannot in general be measured definitely without disturbing the original state. Also, the "no cloning theorem" indicates that the creation of identical copies of the non-orthogonal states is forbidden.

Two bases are commonly used and provide polarization state pairs in a rectilinear basis of vertical and horizontal polarization, e.g., 0° and 90°, and a diagonal basis, e.g., 45° and 135°. It is possible to use a third circular basis of left-handedness and right-handedness, depending on what other bases are used that are conjugate to each other. Generally, the transmitter node, e.g., Alice, will create a random bit and random basis, and transmit a single photon in the polarization state defined by the bit and basis, and record the time the photon was transmitted over the quantum communications channel. This process is repeated for a string of bits as single photons.

The receiver node, e.g., Bob, will select at random a basis for measuring each bit and record the time of receipt, the measurement basis, and measurement result for each received bit. The receiver node, e.g., Bob, may communicate the basis in which each photon was received, and the transmitter node, e.g., Alice, may communicate the basis in which each photon was transmitted. Any bits in which a different basis was used are discarded, leaving the remaining bits as the basis for a shared key. This process is often referred to as key verification or the key sifting phase. A subset of shared bits used by both parties at the respective transmitter and receiver nodes, e.g., Alice and Bob, may be used to check against eavesdropping by an unauthorized third party, e.g., Eve, which would have introduced errors. Different reconciliation and privacy amplification techniques may be used to determine a shared key.

Current cryptographic standards, such as the FIPS 197 encryption as an Advanced Encryption Standard (AES), may ensure security for many types of data. These well-known cryptographic standards, however, may become obsolete as advances occur in quantum computing that allow encryption codes to be broken more readily. As a result, newer techniques, such as QKD systems, may ensure more secure communication, especially in banking and other communications that require high security and efficient cryptographic standards. QKD techniques are attractive, but they depend on the adaptability of modern communication systems since secure cryptographic communications often use specific types of communication links, including optical fiber and free-space optical (FSO) communications, such as satellite links. These communication links are influenced by atmospheric effects, time of day and different seasons, link distances, and transmitter node and receiver node characteristics. The demanding technical requirements associated with QKD systems typically require that cryptographic keys may have to be distributed across a dynamic topography of layered networks, having both stationary and mobile nodes, and communication links that cover different domains across the ground, air and space. A QKD system may desirably provide guaranteed, secured communications across a disparate set of communication links.

SUMMARY OF THE INVENTION

In general, a quantum communications system may include a communications system operative with a quantum key distribution (QKD) system, which includes a transmitter node, a receiver node, and a quantum communications channel coupling the transmitter node and receiver node. The transmitter node may be configured to transmit to the receiver node a bit stream of optical pulses, and switch between first and second QKD protocols based upon at least one channel condition.

The transmitter node may comprise a switch for switching between the first protocol and the second protocol. A channel monitoring device may be configured to monitor the at least one channel condition and operate the switch responsive thereto. The transmitter node may comprise a continuous-variable QKD (CV-QKD) protocol device for generating the first QKD protocol, and a discrete-variable QKD (DV-QKD) protocol device for generating the second QKD protocol.

The channel may comprise a free-space optical (FSO) communications channel. The at least one channel condition may comprise a link distance for the FSO optical communications channel. The transmitter node may switch from the first QKD protocol to the second QKD protocol when the link distance exceeds a threshold, for example.

Another aspect is directed to a method of operating a quantum communications system that may comprise a communications system and a quantum key distribution (QKD) system operable therewith. The QKD system may comprise a transmitter node, a receiver node, and a quantum communications channel coupling the transmitter node and receiver node. The method may comprise operating the transmitter node to transmit to the receiver node a bit stream of optical pulses and switching the transmitter node between first and second QKD protocols based upon at least one channel condition.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete.

Figure 1:
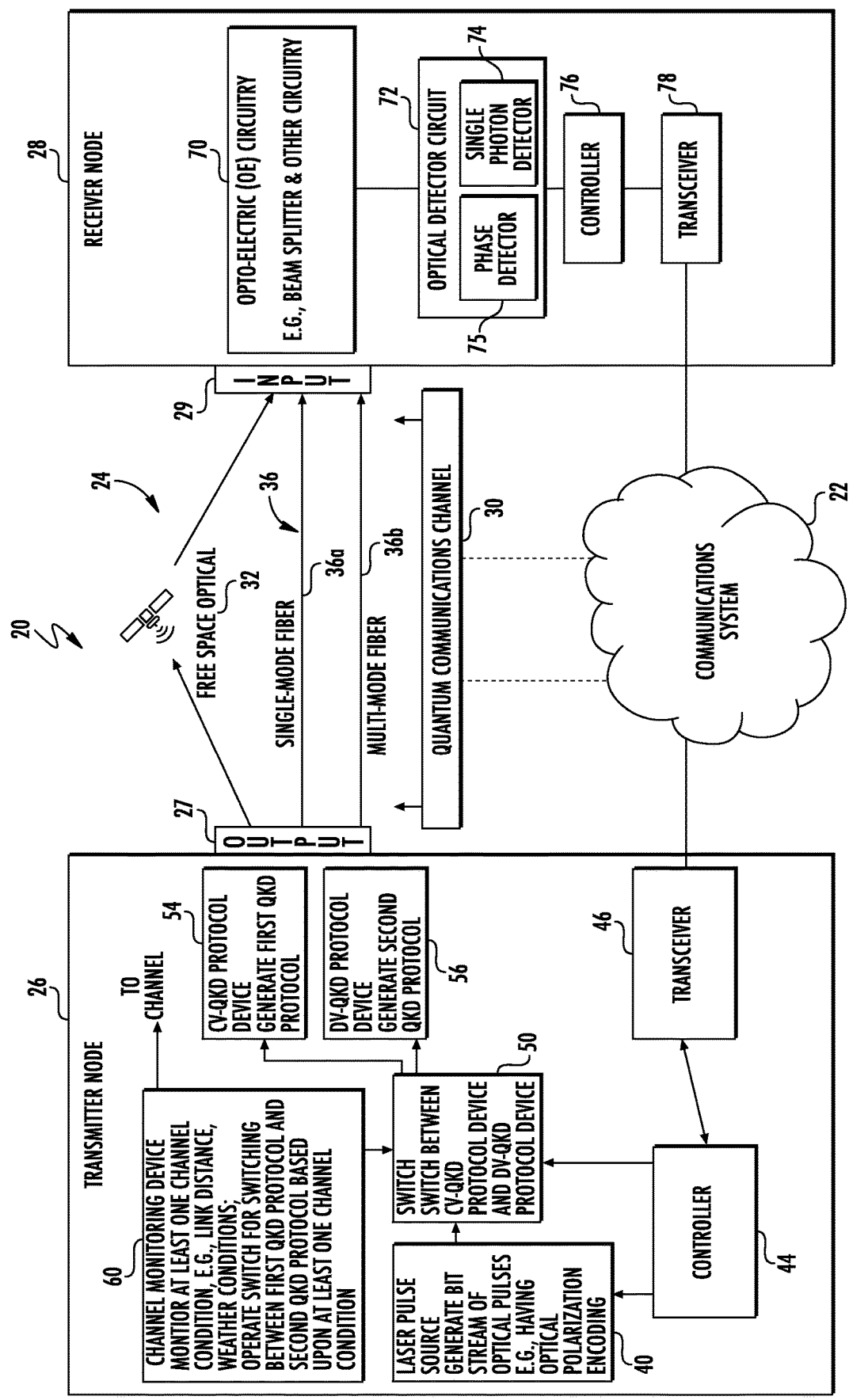
FIG. 1 is a block diagram of the quantum communications system according to the invention.

Referring initially to FIG. 1, a quantum communication system is illustrated generally at 20 and includes a communications system 22 as a non-quantum communications system and a quantum key distribution (QKD) system 24 operable with the communication system. The QKD system 24 includes a transmitter node 26, a receiver node 28, and a quantum communications channel 30 coupling the transmitter node and receiver node. In an example, the quantum communications channel 30 may include a free-space optical (FSO) communications channel indicated at 32, such as point-to-point, or using a satellite; or the quantum communications channel may be a fiber optic communications channel indicated at 36, such as a single mode optical fiber 36a or multi-mode optical fiber 36b.

The transmitter node 26 not only communicates with the receiver node 28 over the quantum communications channel 30, but also communicates via the communications system 22, which may include a non-quantum or conventional communications channel and may be fiber optic, free-space, wired, or another communications channel. The quantum communications channel 30 may be part of the communication system 22 as indicated by the dashed lines connecting the two, indicating that both the quantum communications and non-quantum communications may be transmitted over fiber optic communications channel or over an FSO communications channel that is part of the communications system 22.

When describing a quantum communication systems 20, the transmitter node 26 is usually referred to as "Alice" and the receiver node 28 is usually referred to as "Bob." Any eavesdropper on the quantum communications system 20 is usually referred to as "Eve." The transmitter node 26 includes a laser pulse source 40 for generating a bit stream of optical pulses. Although a laser pulse source 40 is described, it should be understood that other sources may possibly be used that generate the bit stream of optical pulses. It is possible depending on system design for one or more light emitting diodes (LED's) to be used to generate the bit stream of optical pulses.

The optical pulse output from the transmitter node 26 is an output bit stream of photons that are encoded bit values. The photon polarization provides the complementary property used for encoding purposes, such as in the QKD protocol, BB84, and may be applied to conjugate states such as phase encoding. Other protocols, such as the E91 protocol, may be used that includes the entanglement of photon pairs. Each bit of information such as a "0" or "1" may be encoded onto an individual photon by selecting from a pair of orthogonal polarization states. In the BB84 QKD protocol, two pairs of orthogonal states are used, and each pair of orthogonal states is referred to as a "basis." The bases provide polarization state pairs in a rectilinear basis having vertical and horizontal polarization, such as 0° and 90°, and a diagonal basis having opposite diagonal direction polarization, such as 45° and 135°. It is also possible to use a circular basis of left-handedness and right-handedness depending on what other bases are used that are conjugate to each other.

The transmitter node 26 includes a controller 44 operatively connected to the laser pulse source 40 and other components at the transmitter node for controlling their operation, such that the laser pulse source is controlled for transmitting a photon in a polarization state defined by the bit and basis, and record the time the photon was transmitted. This process is repeated for the string of bits as a stream of photons. The transmitter node 26 may include a transceiver 46 connected to the controller 44 and operative to communicate with the receiver node 28 via the communications system 22 using, for example, an unencrypted non-quantum communications channel for the key exchange or key sifting process, as key exchange is commonly called.

The transmitter node 26 transmits the bit stream of optical pulses over the quantum communications channel 30, which as noted above, could be the FSO communications channel 32, via satellite or point-to-point, or the fiber optic communications channel 36, and as either separate or a part of the communications system 22. It is possible to use the same optical fiber for both quantum communications and conventional communications for key exchange, such as unencrypted communications used in key sifting.

The transmitter node 26 is configured to transmit to the receiver node 28 via its output 27, the bit stream of optical pulses and switch between first and second QKD protocols based upon at least one channel condition. As illustrated in FIG. 1, the transmitter node 26 includes a switch 50 for switching between the first and second QKD protocols, which in an embodiment are respectively a continuous-variable QKD (CV-QKD) protocol, and a discrete-variable (DV-QKD) protocol. The transmitter node 26 includes a continuous-variable QKD (CV-QKD) protocol device 54 for generating the CV-QKD protocol and a discrete-variable QKD (DV-QKD) protocol device 56 for generating the DV-QKD protocol. Single photons are generated for the DV-QKD protocol, usually as optical pulses, and as explained in further detail below, requiring single photon detectors at the receiver node 28, for example, as an array of single photon optical detectors. In contrast to the DV-QKD protocol, the CV-QKD protocol uses conjugate, continuous degrees of freedom (field quadratures) of a light pulse prepared in a Gaussian (coherent or squeezed) state to transmit signals that constitute a shared randomness. At the receiver node 28, the field quadratures of each light pulse may be measured using as an example, shot-noise limited, balanced homodyne or heterodyne detectors, which have an advantage of not requiring single photon detection and operating at high GHz speed detection rates. In the CV-QKD protocol, often a local oscillator (LO) signal may be generated at the transmitter node 26 and the CV-QKD protocol may involve polarization encoding and multiplexing techniques.

A channel monitoring device 60 is configured to monitor at least one channel condition and operate the switch 50 responsive to the measured channel condition. For example, the quantum communications channel 30 may be an FSO communications channel 32, and the monitored channel condition may be its link distance. The transmitter node 26 may switch from transmitting optical pulses using, for example, the first CV-QKD protocol to the second DV-QKD protocol when the link distance exceed a threshold, for example, 50 kilometers.

A single cryptographic key may be obtained by incorporating the secret bits obtained from communications in both the CV-QKD protocol and the DV-QKD protocol. Depending on the length of the cryptographic key and the properties of the quantum communications channel 30, such as the ESO communications channel 32, over which the cryptographic key is distributed, either the CV-QKD or the DV-QKD protocol may be selected to obtain the maximum secret key rate (SKR).

The receiver node 28 may include receiver opto-electronic (OE) circuitry 70 that receives via the input 29 the bit stream of optical pulses from the transmitter node 26 over the quantum communications channel 30. An optical detector circuit 72 receives the bit stream of optical pulses from the OE circuitry 70 and detects the optical pulses, such as via at least one single photon detector 74, and generates appropriate signals that may be processed via a controller 76 at the receiver node 28 demodulate depending on the type of CV-QKD or DV-QKD protocol. The OE circuitry 70 may include in an example a circuit that detects the specific CV-QKD or DV-QKD protocols and employ appropriate circuitry at both the OE circuitry and optical detector circuit 72 for processing signals depending on the protocol.

At the receiver node 28, the optical detector circuit 72 may be formed as one or more single photon optical detectors 74, for example, formed as a photon detector array. The optical detector circuit 72 may be connected to the controller 76, which may process and demodulate the signals received from the optical detector circuitry based upon the CV-QKD protocol or DV-QKD protocol. The optical detector circuit 72 may also include a phase detector 75 and include balanced homodyne or heterodyne detectors that are configured to detect optical signals modulated using the CV-QKD protocol.

The controller 76 at the receiver node 28 may be connected to a conventional transceiver 78 also located at the receiver node 28. This transceiver 78 may communicate via the conventional or non-quantum communication system 22 with the transceiver 46 located at the transmitter node 26. For example, Bob as the party at the receiver node 28 may communicate with Alice as the party at the transmitter node 26 over the conventional communications system 22, and transmit data regarding the basis in which each photon was received at the receiver node 28. The transmitter node 26, e.g., Alice, may transmit data about the basis in which each photon was transmitted to the receiver node 28, e.g., Bob, using the conventional communication system 22. Any bits having a different basis may be discarded, leaving the remaining bits as the basis for a shared cryptographic key in the key verification or key sifting phase. The subset of shared bits used by both parties, e.g., Alice and Bob, as to the respective transmitter and receiver nodes 26, 28, may be used to check against eavesdropping by the unauthorized party, e.g., Eve, which would have introduced errors into the communications stream of bits.

The transmitter node 26 may include other components not illustrated in detail, such as a spatial light modulator (SLM) that imposes a spatially varying modulation by modulating intensity and phase, a waveguide array that increases bit generation and phase bin states, and an attenuation filter. As noted above, the receiver node 28 may include the phase detector 75 and homodyne detection applicable for the CV-QKD protocol. The OE circuitry 70 may include a beam splitter and other circuitry to split any incoming optical pulse streams for time processing and phase processing.

The use of the CV-QKD protocol and DV-QKD protocol may be used with other protocols that provide a desired secret key rate (SKR) for the communications link as part of the quantum communication channel 30. An example may include satellite links where the link limits the raw key rate due to signal loss and may be more vulnerable to attack, and thus, will use well-defined security proofs. In a non-limiting example, the high raw key rate that the CV-QKD protocol provides may be combined with the security that the DV-QKD protocol supports and may be used to create a hybrid protocol for high SKR key distribution across lossy and turbulent communication links. As compared to DV-QKD protocol, the CV-QKD protocol may enable higher raw bit rates due to compatibility with standard telecommunications multiplexing techniques, while the DV-QKD protocol offers well-defined security proofs, but may have lower overall raw key rates, and thus, the achievable SKR is low. The quantum communication system 20 as described increases the key rate while also maintaining security, encoding the quantum bit stream and switching between protocols such as an RF-assisted and modulated CV-QKD protocol and a time and phase bin DV-QKD protocol.

In a non-limiting example of operation, at the transmitter node 26, e.g., Alice, the controller 44 may be operative to select a discrete-modulation level from the constellation for the CV-QKD protocol, e.g., M-ary QAM or PSK. This may be followed by a modulation state being randomly slotted into one of "N" discrete DV-QKD time and phase-bins that are similar to pulse position modulation (PPM). After encoding these symbols, which represent hybrids of continuous and discrete quantum variables, onto the laser pulses, for example, with a standard I/Q modulator, the resulting bit stream may be attenuated before being transmitted over the quantum communications channel 30, and in an example, the FSO communications channel 32, characterized by its quantum bit error rate (QBER), transmissivity, and excess noise (E).

At the other end of the quantum communications channel 30, in an example embodiment, the receiver node 28 may randomly choose the state that the receiver node measures, such as the DV-QKD protocol or CV-QKD protocol, by switching between circuits as part of the OE circuitry 70 and optical detector circuit 72 based on an optimal probability of selection. After a sufficient number of symbols have been exchanged, the receiver node 28 may publicly announce whether the receiver node employed circuitry for detecting optical pulses employing the CV-QKD protocol or DV-QKD protocol, as well as a subset of the bit stream. With this information, the transmitter node 26 may calculate the QBER of the communications and compare this value to a prescribed threshold, below which the protocol may be considered secure. Once the QBER has been verified, the receiver node 28 may initiate a reverse reconciliation so that the bit stream is jointly derived from both the CV-QKD and DV-QKD protocols. Privacy amplification may be used to distill a secret key. In an example, this process as described may be referred to as a serial interleaved Quantum Key Distribution (iQKD) using a synchronous iQKD protocol.

Figure 2:
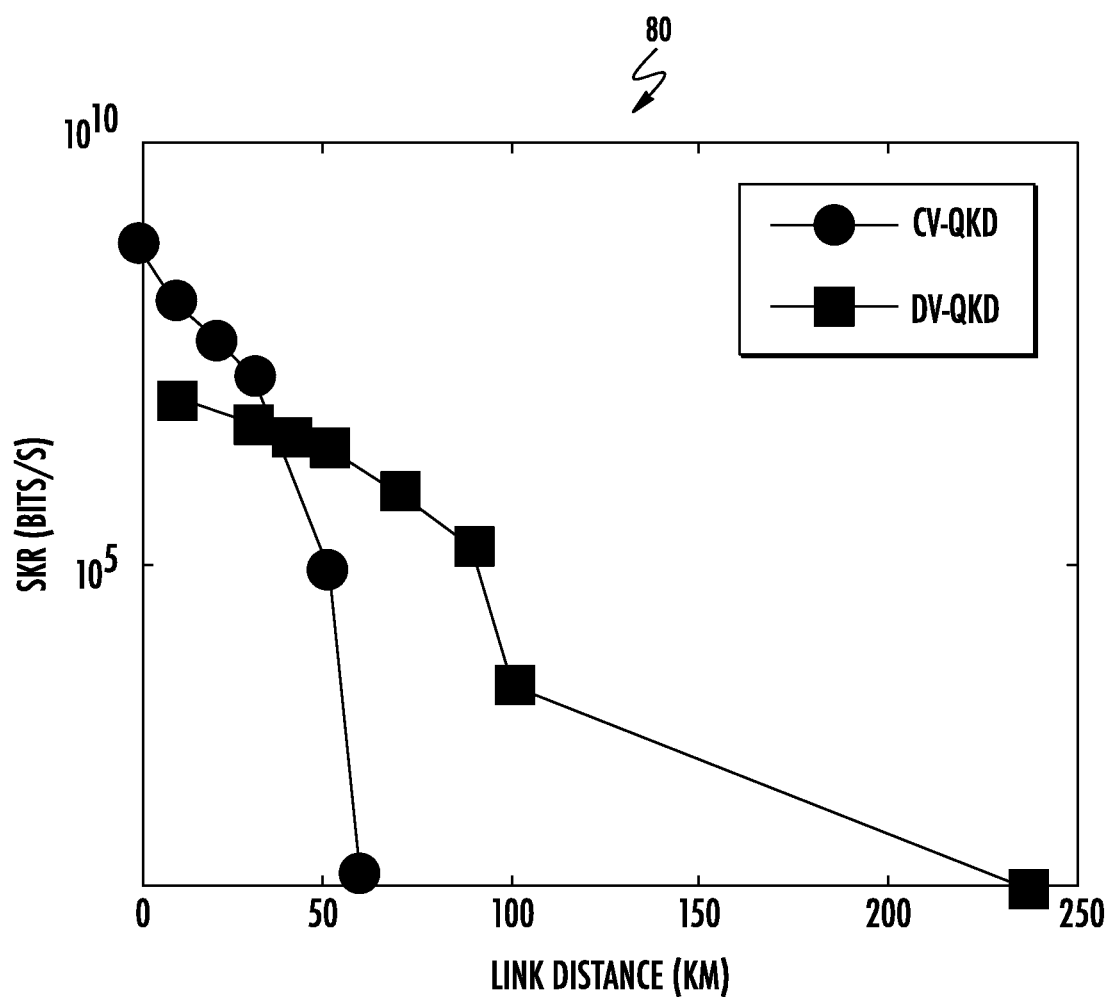
FIG. 2 is a graph showing the link distance versus the secret key rate (SKR) in examples of the CV-QKD and DV-QKD protocols used in the quantum communications system of FIG. 1.

Referring to FIG. 2, there is illustrated at 80 a graph showing one example of the SKR for communications in a particular link using the DV-QKD protocol and CV-QKD protocol, such as by employing a balanced homodyne detector (BHD). The horizontal axis shows a link distance in kilometers versus the SKR in bits per second on the vertical axis. The maximum SKR may be achieved with either a CV-QKD protocol or a DV-QKD protocol depending on the link distance as illustrated, where at above a link distance of above about 50 km in this one example, the SKR drops quality to almost zero for communications employing CV-QKD, while communications employing DV-QKD maintain a SKR up to about 250 km. The use of both the CV-QKD and DV-QKD protocols enables high speed quantum communications at above 100 Mbps.

The channel monitoring device 60 monitors at least one channel condition, such as the link distance, and operates the switch 50 responsive to the monitored channel conditions and switches between a plurality of protocols, and in an example, CV-QKD and DV-QKD protocols. Besides just two protocols—one CV-QKD and one DV-QKD, the system may use a plurality of protocols, for example, a bank of protocols could be drawn from based on channel condition. For one channel condition, the system 20 may use all DV-QKD protocols, e.g., four protocols to complete a key transmission or mission objective. For another series of channel conditions, the system may use all CV-QKD and draw from the bank three protocols to meet that mission objective, or for yet another type of fluctuating channel condition, the system could draw, for example, six protocols from the bank that would represent a mix between CV-QKD and DV-QKD resources to satisfy mission objectives in those atmospheric conditions. In an example, the switch 50 may include a dynamically configurable modem to help toggle between the different protocols, and in this example, the CV-QKD protocol device 54 and DV-QKD protocol device 56 to implement the selected CV-QKD protocol or DV-QKD protocol as an example. An advantage in having the transmitter node 26 transmit in different protocols, such as either the CV-QKD protocol or DV-QKD protocol is the SKR may be guaranteed to lie within a well-defined range of values to equalize the SKR and facilitate communications planning and ensure that the cryptographic keys can be reliably distributed within a narrow operating window. Also, the channel monitoring device 60 may monitor varying weather and atmospheric conditions and make any switch to an appropriate QKD protocol. For example, one QKD protocol may be suited for a certain channel condition and time period and the QKD protocol switched, depending on the time of day, different seasons, and other channel conditions that may be monitored.

Figure 3:
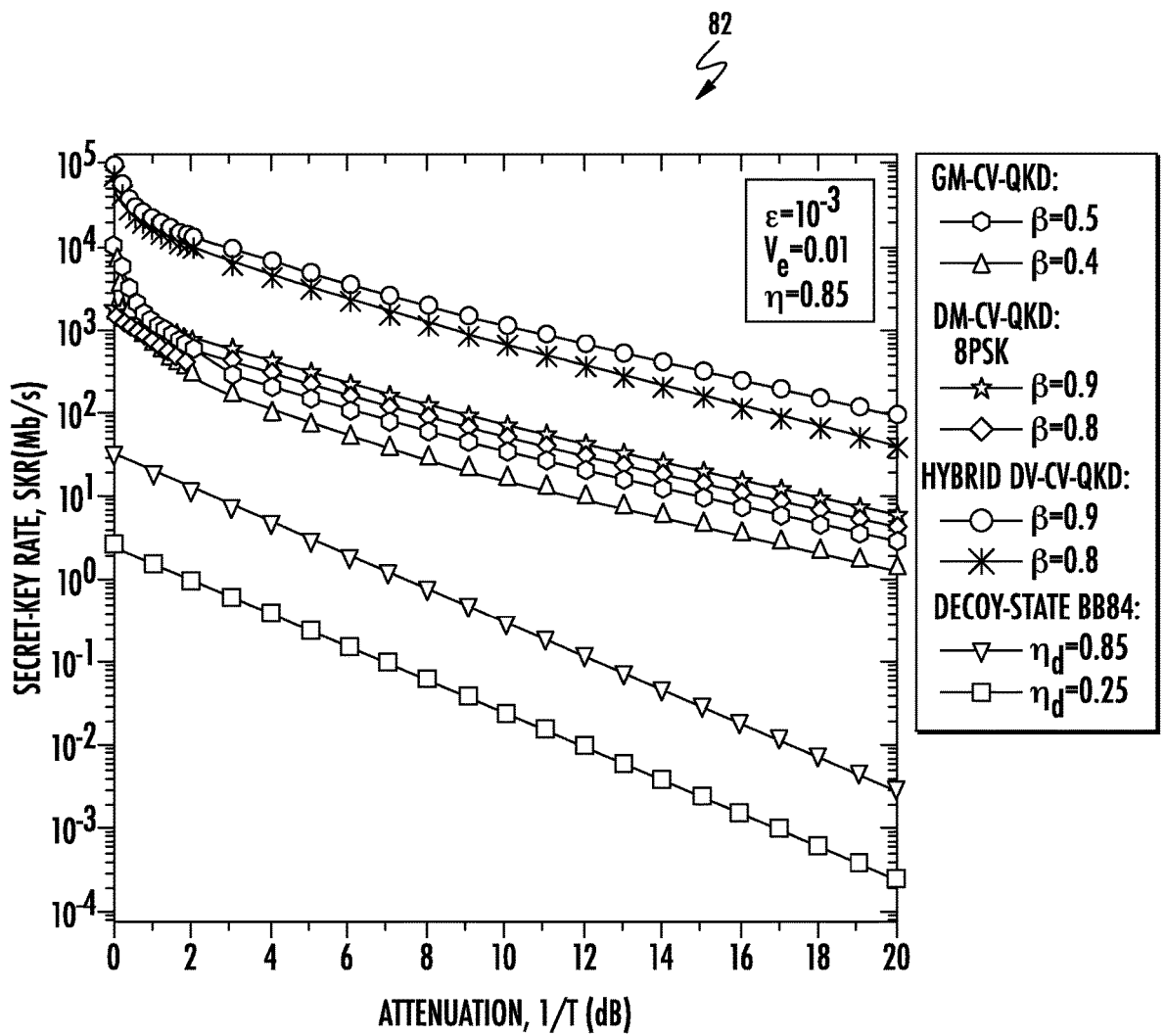
FIG. 3 is a graph showing SKR performance as a function of channel loss for different protocols.

In the graph of FIG. 3 at 82, mathematical modeling results for the SKR performance of the synchronous iQKD protocol as described above is illustrated (marked as Hybrid DV-CV-QKD) as a function of the channel attenuation in decibels, and compared to both Gaussian-modulated (GM) and 8-PSK discrete-modulated (DM) CV-QKD, assuming typical values for the reconciliation efficiency β, and also compared with a Decoy-state BB84 DV-QKD. It is evident from the graph 82 that the quantum communications system 20 using a hybrid DV-CV-QKD has the highest SKR compared to the other protocols. Simulation parameters are given in Table I below using a balanced coherent detector and single photon detector 74 for the CV-QKD and DV-QKD protocols, respectively. Using the CV-QKD protocol, the raw transmission rate was set to 1 Gbps. The synchronous iQKD protocol explained above as the Hybrid DV-CV-QKD outperformed the straight CV-QKD and DV-QKD protocols, with a SKR above 100 Mbps and theoretically achievable for up to 20 dB of channel loss. Thus, the quantum communications system 20 may achieve high SKR key distribution across long range communication links, e.g., ship-to-satellite.

TABLE I

| DV SPD dead time | 10 ns |
| DV Det. efficiency ($\eta_d$) | 0.25, 0.85 |
| DV Visibility (V) | 0.99 |
| DV Dark count rate ($p_d$) | $10^{-6}$ |
| CV Elec. noise var. ($v_{el}$) | $10^{-2}$ |
| CV Excess noise var. (ε) | $10^{-3}$ |
| CV Det. efficiency (η) | 0.85 |

Figure 4:
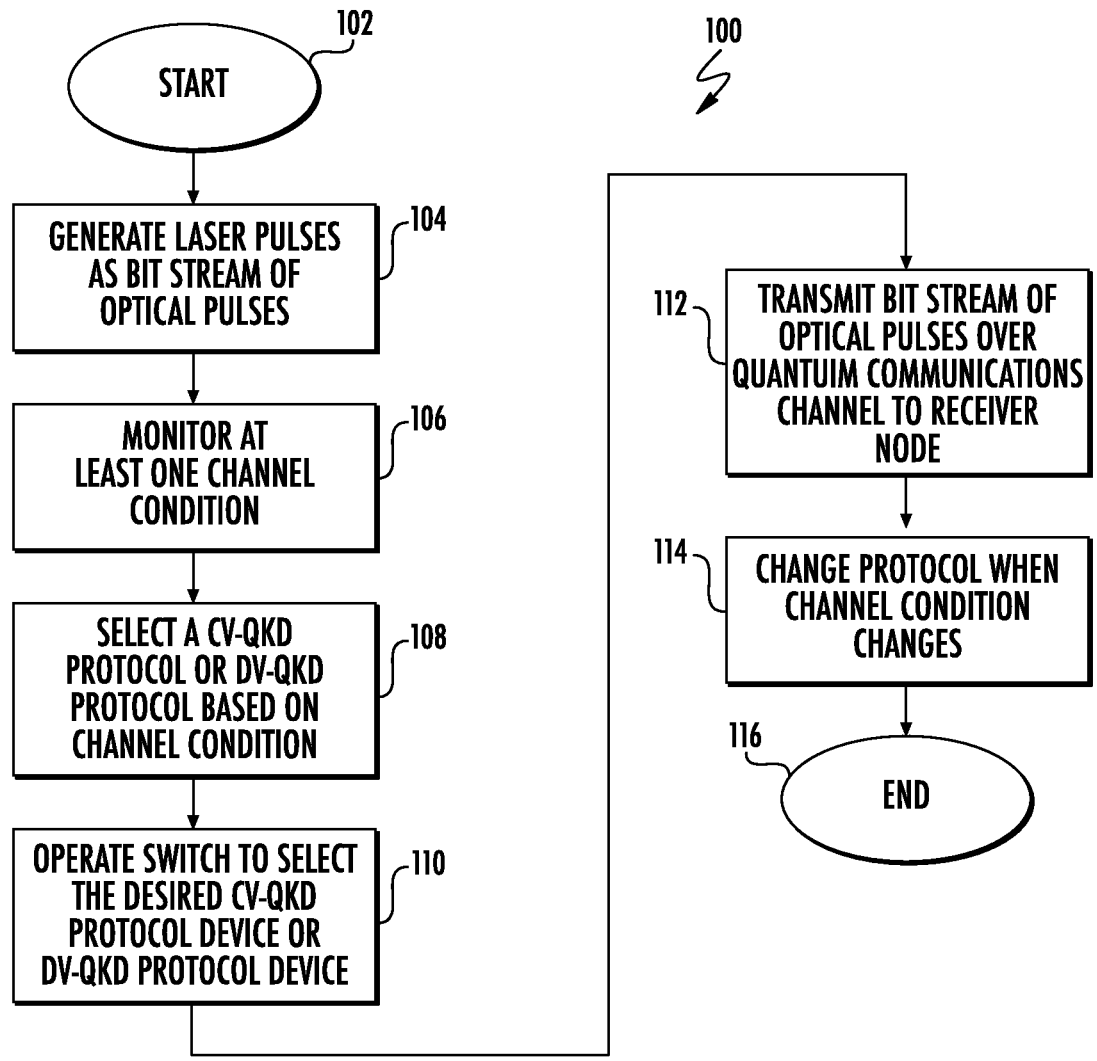
FIG. 4 is a high-level flowchart of a method for operating the quantum communications system of FIG. 1.

A flowchart illustrating the method of operating the quantum communications system is illustrated in FIG. 4 at 100. The process starts (Block 102) and the laser pulse source 40 generates a bit stream of optical pulses (Block 104). The channel monitoring device 60 monitors at least one channel condition (Block 106), and based on the measured channel condition, will select a specific CV-QKD protocol or DV-QKD protocol (Block 108) for transmission. The switch 50 is operated to select the CV-QKD protocol device 54 or DV-QKD protocol device 56 (Block 110) and the bit stream of optical pulses is modulated and transmitted to the receiver node (Block 112). The channel monitoring device 60 maintains its monitoring status, and when a channel condition changes, such as link conditions, the switch changes the protocol (Block 114). The process ends (Block 116).

It is possible the quantum communications system 20 may be incorporated within the physical and data link layers within a quantum-based mobile ad-hoc network (MANET) that includes FSO links and nodes on a range of platforms, such as unmanned aerial vehicles (UAV). It is also possible to maintain point-to-point communication links in a network that includes techniques for FSO Pointing, Acquisition and Tracking (PAT) and MANET linked protocols, including neighbor discovery and distribution of quantum resources, such as single-proton, and entangled states. It is also possible to change the type of protocol such as CV-QKD protocol and DV-QKD protocol based on different levels of security and communication rates.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A quantum communications system comprising:
a communications system; and
a quantum key distribution (QKD) system operable with the communications system and comprising a transmitter node, a receiver node, and a quantum communications channel coupling the transmitter node and receiver node;
the transmitter node configured to transmit to the receiver node a bit stream of optical pulses and switching between first and second QKD protocols based upon a link distance of the quantum communications channel exceeding a threshold.

2. The quantum communications system of claim 1 wherein the transmitter node comprises a switch for switching between the first protocol and the second protocol.

3. The quantum communications system of claim 2 wherein the transmitter node comprises a channel monitoring device configured to monitor the link distance of the quantum communications channel and operate the switch responsive thereto.

4. The quantum communications system of claim 1 wherein the transmitter node comprises a continuous-variable QKD (CV-QKD) protocol device for generating the first QKD protocol, and a discrete-variable QKD (DV-QKD) protocol device for generating the second QKD protocol.

5. The quantum communications system of claim 1 wherein the quantum communications channel comprises a free-space optical (FSO) communications channel.

6. A quantum key distribution (QKD) system comprising:
a transmitter node, a receiver node, and a quantum communications channel coupling the transmitter node and receiver node; and
the transmitter node configured to transmit to the receiver node a bit stream of optical pulses and switching between first and second QKD protocols based upon a link distance of the quantum communications channel exceeding a threshold.

7. The QKD system of claim 6 wherein the transmitter node comprises a switch for switching between the first protocol and the second protocol.

8. The QKD system of claim 7 wherein the transmitter node comprises a channel monitoring device configured to monitor the link distance of the quantum communications channel and operate the switch responsive thereto.

9. The QKD system of claim 6 wherein the transmitter node comprises a continuous-variable QKD (CV-QKD) protocol device for generating the first QKD protocol, and a discrete-variable QKD (DV-QKD) protocol device for generating the second QKD protocol.

10. The QKD system of claim 6 wherein the quantum communications channel comprises a free-space optical (FSO) communications channel.

11. A method of operating a quantum communications system comprising a communications system and a quantum key distribution (QKD) system operable therewith, the QKD system comprising a transmitter node, a receiver node, and a quantum communications channel coupling the transmitter node and receiver node, the method comprising:
operating the transmitter node to transmit to the receiver node a bit stream of optical pulses; and
switching the transmitter node between first and second QKD protocols based upon a link distance of the quantum communications channel exceeding a threshold.

12. The method of claim 11 wherein the transmitter node comprises a switch for switching between the first protocol and the second protocol.

13. The method of claim 12 wherein the transmitter node comprises a channel monitoring device configured to monitor the link distance of the quantum communications channel and operate the switch responsive thereto.

14. The method of claim 11 wherein the transmitter node comprises a continuous-variable QKD (CV-QKD) protocol device for generating the first QKD protocol, and a discrete-variable QKD (DV-QKD) protocol device for generating the second QKD protocol.

15. The method of claim 11 wherein the quantum communications channel comprises a free-space optical (FSO) communications channel.

* * * * *